United States Patent [19]

Latourrette et al.

[11] Patent Number: 4,540,559
[45] Date of Patent: Sep. 10, 1985

[54] PREPARATION OF TYPE Y ZEOLITES

[75] Inventors: Bertrand Latourrette, Le Raincy; Regis Poisson, Asnieres, both of France

[73] Assignee: Rhone-Poulenc Specialites Chimiques, Courbevoie, France

[21] Appl. No.: 525,273

[22] Filed: Aug. 22, 1983

[51] Int. Cl.³ .............................................. C01B 33/28
[52] U.S. Cl. ...................................... 423/329; 502/79
[58] Field of Search ............................... 423/328–330; 502/79

[56] References Cited

U.S. PATENT DOCUMENTS

| | | | |
|---|---|---|---|
| 3,130,007 | 4/1964 | Breck | 423/328 |
| 4,016,246 | 4/1977 | Whittam | 423/329 |
| 4,271,135 | 6/1981 | Wuest et al. | 423/329 |

FOREIGN PATENT DOCUMENTS 2517291  6/1983  France ............................... 423/329

Primary Examiner—Edward J. Meros
Attorney, Agent, or Firm—Burns, Doane, Swecker & Mathis

[57] ABSTRACT

Type Y zeolites were adopted as, e.g., catalysts and adsorbents, are facilely prepared by (i) intimately admixing, at essentially ambient temperature, an aqueous solution of a water-soluble aluminum compound with an aqueous solution of sodium silicate as to prepare a reaction mixture solution or sol therefrom, (ii) next heating said reaction mixture solution or sol to a temperature of crystallization, ranging from about 50° to 120° C., by heat exchange within such rapid period of time as to avoid any phase conversion thereof, but whereafter said reaction mixture solution or sol transforms essentially immediately into a gel, and (iii) thence maintaining the resulting gel at such crystallization temperature until Type Y zeolite crystals are crystallized therefrom.

13 Claims, No Drawings

PREPARATION OF TYPE Y ZEOLITES

BACKGROUND OF THE INVENTION

1. Field of the Invention

The present invention relates to an improved process for the preparation of Type Y zeolites.

2. Description of the Prior Art

Type Y zeolites are well known crystalline zeolites having the same structure as natural faujasite or Type X zeolites, but a different chemical composition. U.S. Pat. No. 3,130,007 describes the characteristic compositions of Type Y zeolites and reports their X-ray powder diffraction data.

Various processes for the preparation of Type Y zeolites are known to the art. Said U.S. Pat. No. 3,130,007, for example, features a process comprising the following steps:

(1) preparing an aqueous mixture of given proportions from a sodium aluminate and a silica source selected from among colloidal silica sols, silica gels, silicic acid, sodium silicate, and amorphous solid silicas;

(2) whereupon the reaction mixture is immediately gelled, and then digesting same at ambient temperature for a period of time ranging from 16 to 40 hours;

(3) next heating the reaction mixture to a temperature of about 100° C., without agitation (to avoid formation of competing zeolites), until Type Y zeolite crystals are formed; and (4) finally, separating the product Type Y zeolite crystals from the mother liquor, through filtration. The crystals are then washed and dried.

The process described in the aforenoted U.S. Pat. No. 3,130,007 has the essential disadvantage of requiring a long period of digestion at ambient temperature and equally long crystallization periods. Indeed, according to Example 14 of this patent, the digestion was for 28 hours and the crystallization was for 48 hours.

And in French Pat. No. 1,475,167 is described a process for the preparation of Type Y zeolites comprising the following steps:

(1) preparing an aqueous reaction mixture of a soluble aluminum compound, a siliceous component having a degree of activity of at least 100 units (called an "active silicate"), and colloidal silica;

(2) whereupon the reaction mixture is immediately gelled, and then crystallizing Type Y zeolite crystals by aging same at a temperature of from 20° to 120° C. under agitation; and (3) separating the product Type Y zeolite crystals therefrom, and washing and drying same.

The process described in said French Pat. No. 1,475,167 has the essential drawback of requiring the use of a very special "active silicate" that severely limits its attractiveness from a manufacturing point of view. To use such process, it is moreover necessary to verify the "activity" of the silicate beforehand. Cf. U.S. Pat. No. 4,164,551.

SUMMARY OF THE INVENTION

Accordingly, a major object of the present invention is the provision of an improved process for the preparation of the Type Y zeolites which avoids the disadvantages and drawbacks to date characterizing the state of this art, and whereby pure Type Y zeolites are obtained without the necessity for unduly lengthy processing steps, and from raw materials which are readily commercially available.

Briefly, the present invention features a process for the preparation of Type Y zeolites comprising the following steps:

(i) first preparing, at ambient temperature, a reaction mixture comprising an aqueous solution of a soluble aluminum compound and an aqueous solution of sodium silicate, thus providing a reaction solution or sol;

(ii) next effecting a rapid heat transfer to raise the temperature of the reaction mixture solution/sol from ambient temperature to the crystallization temperature, which ranges from 50° to 120° C., no change of state occurring thereby, but following which the solution/sol is immediately transformed into a gel; and (iii) thence heating the reaction mixture to a temperature ranging from 50° to 120° C. until Type Y zeolite is crystallized therefrom.

The Type Y zeolite thus obtained is 100% crystallized, i.e., it is completely pure.

DETAILED DESCRIPTION OF THE INVENTION

More particularly according to the present invention, in the first step of the process consistent herewith, an aqueous solution of a soluble aluminum compound is intimately admixed at ambient temperature with a sodium silicate solution to provide a solution or a sol thereof.

By the word "sol" as utilized herein, there is intended a colloidal system, the dispersing phase of which is a liquid and the dispersed phase is a solid. For purposes of this invention, a sol is to be differentiated from a gel, which is a viscoelastic mass formed from certain colloidal suspensions.

The sol or solution of the invention may be obtained either by continuous admixture of the reactants or by rapid mixing of said reactants under violent agitation. The mixing must be carried out in such manner as to avoid gellification, or gelation. In other words, the mixing time must be less than the time after which the mixture begins to gel. This "gellification" time primarily depends upon the chemical composition of the reaction mixture, the nature of the reactants, and the temperature.

The aqueous solution of the soluble aluminum compound which is used according to the invention may be a sodium aluminate solution, or a solution of a water-soluble aluminum salt, such as an aqueous solution of aluminum sulfate, chloride or nitrate, or of aluminum silicate.

Sodium aluminate is preferably employed since it limits any tendency toward introduction of foreign ions into the zeolite lattice.

The sodium silicate solution used in the invention is easily prepared by dissolving hydrated sodium metasilicate in a solution of commercial sodium silicate. The hydrated sodium metasilicate is preferably a commercial penta- or nonahydrated product having the formula $Na_2SiO_3 \cdot 5H_2O$ or $Na_2SiO_3 \cdot 9H_2O$. The aqueous solution of sodium silicate is preferably a commercial solution. For example, the sodium silicate solutions marketed by Rhone-Poulenc may advantageously be used. These have the following compositions by weight:

| % $SiO_2$ | 22.7 | 25.8 | 27.7 | 28.5 | 26.6 | 30.6 |
| % $Na_2O$ | 5.7 | 7.7 | 8.3 | 8.9 | 13.1 | 15.0 |

| -continued | | | | | |
|---|---|---|---|---|---|
| % H₂O | 71.4 | 66.3 | 63.7 | 62.1 | 60.0 | 53.6 |

The proportion of commercial sodium silicate to metasilicate may vary widely, e.g., from 1 to 100% by weight of the total weight of the silica may be introduced in the form of hydrated metasilicate. It is preferred to use from 2 to 60% hydrated metasilicate and more preferably from 5 to 15%.

In another embodiment of the process of the invention, the sodium silicate solution may also contain water and additional sodium hydroxide that has been added to the commercial sodium silicate solution, or to the metasilicate solution, or to the mixture of the two.

The solution of the water-soluble aluminum compound and the aqueous solution of sodium silicate are admixed in proportions such that the molar ratios of the oxides in the mixture are as follows:

$SiO_2/Al_2O_3$:5 to 40;
$Na_2O/SiO_2$:0.2 to 2; and
$H_2O/Na_2O$:12 to 200.

If a water-soluble aluminum salt is used, the molar ratio $Na_2O/SiO_2$ given above does not include the $Na_2O$ which will be used to obtain a neutral sol with the anion liberated during the course of the reaction, e.g., the sulfate resulting in sodium sulfate, the chloride resulting in sodium chloride, etc.

The order in which the reagents are admixed to prepare the sol or solution is not critical. However, to obtain a Type Y zeolite of the highest purity, it is preferred to introduce the solution of the aluminum compound into the solution of the sodium silicate while shaking violently. Devices such as a mixing box, turbine, and static mixer are suitable to carry out the mixing.

In a preferred embodiment of the process of the invention, the reactants are continuously mixed in a tubular reactor, with the dwell time in the reactor being less than the time required for gelation and generally less than one minute.

In the second step of the process of the invention, a very rapid heat transfer is carried out in order to raise the reaction mixture in sol or solution state from ambient temperature up to the crystallization temperature, which ranges from 50° to 120° C. Such heat transfer may be carried out by any means, particularly by placing the sol or solution in contact with water vapor under pressure, or by passing the sol or solution through a heat transfer medium, such as hot petroleum. Preferably, this heat transfer is carried out continuously in less than one minute, and more preferably in less than about one second, by contacting the sol or solution obtained through continuous mixing of the reagents with pressurized water vapor. During the very rapid heat transfer, no change of state of the sol or solution occurs; upon completion thereof, the sol or solution is immediately transformed into a gel.

In the third step of the process of the invention, Type Y zeolite is crystallized by heating the gel obtained in the second step to a temperature ranging from 50° to 120° C., preferably from 90° to 105° C. The period of time required for the heating of the gel may be either short or long, but it must enable totally crystallized and very pure Type Y zeolite to be obtained, i.e., Type Y zeolite containing very little or no amorphous material or other crystalline phases. It is within the skill of the art to determine the optimum time for the crystallization reaction which is determined, inter alia, by the ratios and concentrations of the reactants in the initial reaction mixture, the characteristics of the apparatus used for the process, and the temperature of the reaction. Generally, the optimum period for the crystallization reaction varies from two hours to about 48 hours. This very short time period is one of the advantages of the process of the invention. The lower the molar ratio of silica to alumina in the Type Y zeolite, the shorter the reaction time. The crystallization step may be carried out using any known means, particularly in a double-jacketed reactor. It may or may not be agitated. If it is indeed agitated, agitation should be begun only after about one hour of crystallization has lapsed.

The process of the present invention requires no aging step, which comprises another marked advantage thereof.

The process of the invention enables obtainment of various Type Y zeolites having molar ratios of silica to alumina ranging from three to six.

It is particularly well suited for the preparation of Type Y zeolite having a molar ratio of $SiO_2$ to $Al_2O_3$ greater ' than 4.5.

As is also well known to this art, the Type Y zeolite is typically separated at this point from the mother liquor by means of filtration, after which it is washed in distilled water such that the pH of the effluent wash water will be approximately 10.5. The resulting powder may next be ion-exchanged, dried, calcined, shaped, and the like.

The Type Y zeolites prepared in accordance with the process of the invention have X-ray diffraction patterns characteristic of the Type Y zeolites. They are of high purity.

The zeolites of Type Y prepared consistent herewith are well adopted for the typical Type Y zeolite applications, e.g., adsorption and catalysis.

In order to further illustrate the present invention and the advantages thereof, the following specific examples are given, it being understood that same are intended only as illustrative and in nowise limitative.

EXAMPLE 1

At ambient temperature, an aqueous solution of a water-soluble aluminum compound was intimately admixed with a sodium silicate solution.

The aqueous solution of the soluble aluminum compound consisted of a sodium aluminate solution with the molar composition 1.25 $Na_2O$, 1 $Al_2O_3$, 112 $H_2O$.

The sodium silicate solution used was obtained by dissolving pentahydrated sodium metasilicate, $Na_2SiO_3.5H_2O$, in an aqueous solution of sodium silicate with a composition, by weight, of 28.3% $SiO_2$, 8.2% $Na_2O$, 63.5% $H_2O$ and water. This solution, with the molar composition of 5.29 $Na_2O$, 15 $SiO_2$, 188 $H_2O$, included 10% of the total amount of the silica in the form of pentahydrated metasilicate.

The aqueous solutions of sodium aluminate and sodium silicate were introduced into a static mixer, at 20° C., at rates of 55 liters/hr and 102 liters/hr, respectively. The dwell time in the mixer was 0.5 seconds. In solution, the mixture was characterized by the following molar ratios:

$SiO_2/Al_2O_3 = 15$
$Na_2O/SiO_2 = 0.437$
$H_2O/Na_2O = 45.8$

The mixture in solution was heated from 20° C. to 94° C. by continuous heat transfer using a steam ejector and contacting the reaction mixture with pressurized steam at rates of 157 liters/hr of mixture and 26 kg of steam per hour, with a contact time of approximately 1 second. Upon exiting the steam ejector, the solution instantaneously gelled.

Crystallization of the resulting gel was carried out in a double-jacketed still reactor at 100° C. for eight hours. The crystalline solids were decanted, filtered and washed in distilled water such that the pH of the wash water was approximately 10.5.

The solid product obtained after filtration and washing was a 100% crystallized Type Y zeolite having a molar ratio of $SiO_2$ to $Al_2O_3$ of 4.8.

EXAMPLE 2

At ambient temperature, an aqueous solution of a water-soluble aluminum compound was intimately admixed with a sodium silicate solution.

The aqueous solution of the soluble aluminum compound consisted of a sodium aluminate solution with the molar composition 1.6 $Na_2O$, 1 $Al_2O_3$, 113 $H_2O$.

The sodium silicate solution used was obtained by dissolving pentahydrated sodium silicate, $Na_2SiO_3 \cdot 5H_2O$, in an aqueous solution of sodium silicate having a composition, by weight, of 28.3% $SiO_2$, 8.2% $Na_2O$, 63.5% $H_2O$ and water and sodium hydroxide. This solution, having a molar composition of 4.4 $Na_2O$, 10 $SiO_2$, 187 $H_2O$, included 10% of the total amount of the silica in the form of pentahydrated metasilicate.

The aqueous solutions of sodium aluminate and sodium silicate were continuously introduced, at 20° C., into a static mixer with a contact time of one second and in proportions such that the solution that resulted had the following molar ratios:
$SiO_2/Al_2O_3 = 10$
$Na_2O/SiO_2 = 6$
$H_2O/Na_2O = 50$ The mixture in solution at 20° C. was heated to 100° C. by continuous heat transfer in which the mixture was contacted with pressurized steam in a steam ejector, with a contact time of one second.

The resulting gel was crystallized in a double-jacketed still reactor at 100° C. for four hours. The crystalline solids were decanted, filtered and washed in distilled water such that the pH of the wash water was approximately 10.5.

The solid product obtained after filtration and washing was a 100% crystallized Type Y zeolite having a molar ratio of $SiO_2/Al_2O_3 = 3.8$.

EXAMPLE 3

At ambient temperature, an aqueous solution of a water-soluble aluminum compound was intimately admixed with a sodium silicate sol.

The aqueous solution of soluble aluminum compound consisted of a sodium aluminate solution with a molar composition of 1.4 $Na_2O$, 1 $Al_2O_3$, 77 $H_2O$.

The sodium silicate sol used was obtained by dissolving sodium metasilicate in an aqueous solution of sodium silicate with a composition, by weight, of 28.3% $SiO_2$, 8.2% $Na_2O$ and 63.5% $H_2O$. This sol had a molar composition of 3.6 $Na_2O$, 10 $SiO_2$, 73 $H_2O$ and included 10% of the total amount of the silica in the form of pentahydrated metasilicate.

The sodium aluminate and sodium silicate were introduced, at 20° C., into a static mixer with a contact time of 0.3 second and in proportions such that the sol obtained had the following molar ratios:
$SiO_2/Al_2O_3 = 10$
$Na_2O/SiO_2 = 0.5$
$H_2O/Na_2O = 30$ The temperature of the reaction mixture in sol state at 20° C. was raised to 100° C. by means of continuous heat exchange using a steam ejector contacting the mixture with pressurized steam for one second. Upon exiting the steam injector, instantaneous gelation took place.

The product gel was crystallized in a double-jacketed still reactor at 100° C. for two hours. The crystalline solids were decanted, filtered and washed in distilled water such that the pH of the wash water was approximately 10.5.

The solid product obtained after filtration and washing was a 100% crystallized Type Y zeolite having a molar ratio of $SiO_2/Al_2O_3 = 4$.

EXAMPLE 4

The procedure of Example 1 was repeated, but with variations in the composition of the mixture of reactants.

In the Table which follows are reported the results of the various tests, as well as the characteristics of the reactants and of the mixture obtained. It also reports the 100% crystallization times obtained and the silica/alumina ratio of the Type Y zeolite resulting therefrom.

TABLE

| Test No. | Soluble aluminum compound | | | Sodium silicate | | | $\dfrac{SiO_2 \text{ metasilicate}}{SiO_2 \text{ total}}$ | $\dfrac{SiO_2}{Al_2O_3}$ | Mixture $\dfrac{Na_2O}{SiO_2}$ | $\dfrac{H_2O}{Na_2O}$ | Crystallization time (hours) | Y $\dfrac{SiO_2}{Al_2O_3}$ |
|---|---|---|---|---|---|---|---|---|---|---|---|---|
| | $Na_2O$ | $Al_2O_3$ | $H_2O$ | $Na_2O$ | $SiO_2$ | $H_2O$ | | | | | | |
| 1 | 1.25 | 1 | 112 | 5.29 | 15 | 188 | 0.05 | 15 | 0.44 | 46 | 18 h | 4.8 |
| 2 | 1.25 | 1 | 112 | 6.45 | 15 | 188 | 0.20 | 15 | 0.51 | 42 | 4 h | 4.0 |
| 3 | | $Al(NO_3)_3$ | | 6.20 | 8 | 188 | 0.10 | 8 | 0.40 | 94 | 8 h | 4.4 |
| 4 | | $Al(NO_3)_3$ | | 4.85 | 6 | | 0.10 | 6 | 0.31 | 98 | 8 h | 4.8 |
| 5 | 2 | 1 | 112 | 4 | 8 | 188 | 0.10 | 8 | 0.75 | 50 | 2 h | 3.6 |
| 6 | 1.3 | 1 | 250 | 3.7 | 10 | 350 | 0.10 | 10 | 0.5 | 140 | 10 h | 4.8 |
| 7 | | $Al(NO_3)_3$ | | 7 | 10 | 350 | 0.10 | 10 | 0.4 | 150 | 12 h | 5.0 |
| 8 | | $Al(NO_3)_3$ | | 8 | 10 | 188 | 0.10 | 10 | 0.5 | 60 | 6 h | 4.2 |
| 9 | | $Al(NO_3)_3$ | | 5.1 | 5 | 200 | 0.10 | 5 | 0.42 | 157 | 4 h | 3.8 |
| 10 | 1.5 | 1 | 112 | 4.9 | 15 | 188 | 0.01 | 15 | 0.43 | 47 | 9 h | 4.8 |
| 11 | | $Al(NO_3)_3$ | | 7 | 10 | 188 | 0.10 | 10 | 0.4 | 75 | 8 h | 4.8 |
| 12 | | $Al_2(SO_4)_3$ | | 7 | 10 | 188 | 0.10 | 10 | 0.4 | 75 | 8 h | 4.8 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of Type Y zeolite, comprising (i) intimately admixing, at essentially ambient temperature, an aqueous solution of a water-soluble aluminum compound with an aqueous solution of sodium silicate as to prepare a reaction mixture solution or sol therefrom, (ii) next heating said reaction mixture solution or sol to a temperature of crystallization, ranging from about 50 to 120° C., in less than about one minute, by heat exchange as to avoid any phase conversion thereof, but whereafter said reaction mixture solution or sol transforms essentially immediately into a gel, and (iii) thence maintaining the resulting gel at such crystallization temperature until type Y zeolite crystals are crystallized therefrom.

2. The process as defined by claim 1, said step (i) intimate admixing comprising continuous mixing.

3. The process as defined by claim 1, said step (i) intimate admixing comprising violent agitation.

4. The process as defined by claim 1 wherein said aqueous solution of sodium silicate is prepared by dissolving hydrated sodium metasilicate in a sodium silicate solution comprising by weight about 22.7–30.6% $SiO_2$, about 5.7–15.0% $Na_2O$, and about 71.4–53.6% $H_2O$.

5. The process as defined by claim 4, said hydrated sodium metasilicate comprising from 1 to 100% by weight of the total amount of silica which comprises said sodium silicate solution.

6. The process as defined by claim 5, said hydrated sodium metasilicate comprising from 2 to 60% by weight of said total amount of silica.

7. The process as defined by claim 6, said hydrated sodium metasilicate comprising from 5 to 15% by weight of said total amount of silica.

8. The process as defined by claim 1, said step (i) intimate admixture having the following molar ratios, expressed in terms of the oxides thereof:
$SiO_2/Al_2O_3$:5 to 40;
$Na_2O/SiO_2$:0.2 to 2; and
$H_2O/Na_2O$:12 to 200.

9. The process as defined by claim 1, said step (ii) rapid heat exchange being carried out in less than about one second.

10. The process as defined by claim 1, said step (ii) rapid heat exchange being carried out with pressurized water vapor.

11. The process as defined by claim 1, said step (iii) crystallization being carried out in from about 2 to 48 hours.

12. The process as defined by claim 11, said step (iii) crystallization being carried out at a temperature ranging from about 90° to 105° C.

13. The process as defined by claim 11, said step (i) water-soluble aluminum compound comprising sodium aluminate, aluminum sulfate, aluminum chloride, aluminum nitrate or aluminum silicate.

* * * * *